US008516796B2

(12) United States Patent
Wald et al.

(10) Patent No.: US 8,516,796 B2
(45) Date of Patent: Aug. 27, 2013

(54) SYSTEM AND METHOD FOR MONITORING CATALYST EFFICIENCY AND POST-CATALYST OXYGEN SENSOR PERFORMANCE

(75) Inventors: Wesley W. Wald, Dexter, MI (US);
Robert J. Genslak, Macomb, MI (US);
Edward Stuteville, Linden, MI (US);
Igor Anilovich, Walled Lake, MI (US)

(73) Assignee: GM Global Technology Operations LLC

( * ) Notice: Subject to any disclaimer, the term of this patent is extended or adjusted under 35 U.S.C. 154(b) by 255 days.

(21) Appl. No.: 12/623,013

(22) Filed: Nov. 20, 2009

(65) Prior Publication Data

US 2011/0120095 A1 May 26, 2011

(51) Int. Cl.
*F01N 11/00* (2006.01)

(52) U.S. Cl.
USPC .......... 60/277; 60/274; 60/286; 60/295; 60/300

(58) Field of Classification Search
USPC .............. 60/277, 286, 295, 300, 274
See application file for complete search history.

(56) References Cited

U.S. PATENT DOCUMENTS

| 6,802,181 | B2 | 10/2004 | Wang et al. | |
|---|---|---|---|---|
| 6,874,313 | B2 | 4/2005 | Yurgil et al. | |
| 7,444,235 | B2 | 10/2008 | Anilovich et al. | |
| 7,900,439 | B2 | 3/2011 | Genslak et al. | |
| 2003/0017603 | A1* | 1/2003 | Uchida et al. | 436/37 |
| 2003/0159432 | A1* | 8/2003 | Kobayashi et al. | 60/274 |
| 2004/0244361 | A1* | 12/2004 | Tanabe et al. | 60/274 |
| 2005/0252196 | A1* | 11/2005 | Aliakbarzadeh et al. | 60/277 |
| 2007/0227123 | A1* | 10/2007 | Iida et al. | 60/277 |
| 2008/0115486 | A1* | 5/2008 | Yurgil | 60/277 |
| 2008/0184695 | A1* | 8/2008 | Anilovich et al. | 60/274 |
| 2008/0229727 | A1 | 9/2008 | Wang et al. | |
| 2008/0302087 | A1* | 12/2008 | Genslak et al. | 60/277 |
| 2008/0306673 | A1* | 12/2008 | Yasui et al. | 701/102 |
| 2009/0266054 | A1* | 10/2009 | Iihoshi et al. | 60/277 |
| 2009/0288391 | A1* | 11/2009 | Aoki | 60/273 |
| 2009/0293451 | A1* | 12/2009 | Kesse | 60/274 |
| 2010/0101214 | A1* | 4/2010 | Herman et al. | 60/277 |

* cited by examiner

*Primary Examiner* — Thomas Denion
*Assistant Examiner* — Jorge Leon, Jr.

(57) ABSTRACT

A diagnostic system for an exhaust system of an engine includes a fuel control module and a diagnostic module. The fuel control module, in response to a request for a fuel inhibiting event, operates the engine in a first rich condition for a first period until a catalytic converter of the exhaust system is in a predetermined first rich state and subsequently operates the engine in a lean condition for a second period contiguous with the first period. The diagnostic module determines a catalyst efficiency of the catalytic converter based on an output of an oxygen sensor located downstream of said catalytic converter during the second period, and selectively adjusts a diagnostic status of the catalytic converter based on a comparison of the catalyst efficiency and a predetermined catalyst efficiency. The fuel inhibiting event may be a deceleration fuel-cutoff event. A related diagnostic method is also provided.

23 Claims, 5 Drawing Sheets

SYSTEM AND METHOD FOR MONITORING CATALYST EFFICIENCY AND POST-CATALYST OXYGEN SENSOR PERFORMANCE

FIELD

The present disclosure relates to diagnostic systems and methods for exhaust systems of internal combustion engines, and more particularly to diagnostic systems and methods for monitoring catalytic converter conversion efficiency and post-catalyst oxygen sensor performance.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Motorized vehicles may include a powerplant that produces drive torque that is transmitted through a transmission at one or more gear ratios to a drivetrain to drive wheels of the vehicle. The powerplant may be a hybrid powerplant and may include an internal combustion engine coupled to an electric machine. During operation of the vehicle, the drive torque may be supplied by the engine, the electric machine, or a combination thereof.

Gasoline engines produce drive torque by combusting a mixture of air and gasoline. Exhaust produced by the combustion typically includes various chemical compounds, including carbon dioxide ($CO_2$), water ($H_2O$), nitrogen oxides ($NO_X$), unburned hydrocarbons (HC), sulfur oxides ($SO_X$), and other compounds. The exhaust may be treated in an exhaust system to reduce the emissions of one or more of the various chemical compounds. Vehicle exhaust systems may include a three-way catalytic converter that reduces the emission of $NO_X$, CO, and HC in the exhaust. The catalytic converter may reduce $NO_X$ to nitrogen and oxygen, may oxidize CO to $CO_2$, and may oxidize HC to $CO_2$ and $H_2O$.

Engine control and diagnostic systems may monitor the conversion capability of the catalytic converter (i.e., catalyst efficiency) to inhibit excess $NO_X$, CO, and HC in the exhaust. The conversion capability of the catalytic converter may also be monitored to determine whether the catalytic converter is functioning properly and whether the catalytic converter should be replaced.

Oxygen storage capacity (OSC) is one measure of the conversion capability of the catalytic converter. The OSC refers to the ability of the catalytic converter to store excess oxygen under lean engine operating conditions and to release oxygen under rich engine operating conditions. The amount of oxygen storage and release decreases as the conversion capability of the catalytic converter is reduced. Therefore, the loss in OSC may be related to the loss in conversion capability. Accordingly, engine control and diagnostic systems may periodically determine the OSC of the catalytic converter.

Some methods for determining the OSC monitor pre-catalyst oxygen ($O_2$) sensor output and post-catalyst oxygen ($O_2$) sensor output during intrusive diagnostic tests conducted during steady-state engine operating conditions, such as during engine idle, when consistent emissions output may be achieved. The diagnostic tests include initiating an intrusive fueling event, such as a lean or rich condition, for a predetermined first period. Following the period, the diagnostic test initiates an opposite rich or lean condition for a predetermined second period. During the second period, the output of the pre-catalyst and post-catalyst $O_2$ sensors is monitored and the OSC is computed based on a lag time between the pre-catalyst and post-catalyst $O_2$ sensors detecting the rich or lean condition.

The output of the pre-catalyst and post-catalyst $O_2$ sensors may also be monitored to determine whether the $O_2$ sensors are functioning properly. A common characteristic of a malfunctioning $O_2$ sensor is a lazy or sluggish response. Accordingly, $O_2$ sensor responsiveness is one measure for determining whether the $O_2$ sensors are functioning properly. Some methods of monitoring $O_2$ sensor performance initiate intrusive diagnostic tests that initiate rich and/or lean engine operating conditions during periods of steady-state engine operation. During the periods, the output of the $O_2$ sensor is monitored to measure the responsiveness of the $O_2$ sensor to the changed engine operating conditions.

SUMMARY

The present disclosure provides a control system and method for determining a post-catalyst $O_2$ sensor performance diagnostic value and a catalytic converter conversion efficiency diagnostic value during a single diagnostic test.

In one form, the present disclosure provides a diagnostic system for an exhaust system of an engine that includes a fuel control module and a diagnostic module. The fuel control module, in response to a request for a fuel inhibiting event, operates the engine in a first rich condition for a first period until a catalytic converter of the exhaust system is in a predetermined first rich state and subsequently operates the engine in a lean condition for a second period contiguous with the first period. The diagnostic module determines a catalyst efficiency of the catalytic converter based on an output of an oxygen sensor located downstream of the catalytic converter during the second period, and selectively adjusts a diagnostic status of the catalytic converter based on a comparison of the catalyst efficiency and a predetermined catalyst efficiency. In one feature, the fuel inhibiting event may be a deceleration fuel-cutoff event.

In other features, the first period may end when the output during the first period exceeds a predetermined output. In a related feature, the first period may end when the oxygen sensor detects the first rich condition. In still other features, the fuel control module may operate the engine in the lean condition during the second period until the catalytic converter is in a predetermined lean state. In a related feature, the second period may end when the output during the second period falls below a predetermined output. In another related feature, the second period may end when the oxygen sensor detects the lean condition.

In further features, the fuel control module may operate the engine in a second rich condition for a third period contiguously following the second period. The diagnostic module may determine a first responsiveness of the oxygen sensor based on the output during the second period and a second responsiveness of the oxygen sensor based on the output during the third period. The diagnostic module may selectively adjust a diagnostic status of the oxygen sensor based on the first responsiveness and the second responsiveness.

In a related feature, the first responsiveness may be determined based on the output during a rich-to-lean transition period occurring within the second period and the second responsiveness may be determined based on the output during a lean-to-rich transition period occurring within the third period. In another related feature, the catalyst efficiency may be determined based on the output during the rich-to-lean transition period. In other related features, the diagnostic module may determine the first responsiveness by determining a first normalized integrated area of the output during the rich-to-lean transition period. The diagnostic module may further determine the second responsiveness by determining a second normalized integrated area of the output during the lean-to-rich transition period. In still other related features, the diagnostic module may further determine the catalyst efficiency by determining a normalized oxygen storage capacity based on the output during the rich-to-lean transition period.

In another form, the present disclosure provides a diagnostic method for an exhaust system of an engine. The method includes operating the engine, in response to a request for a fuel inhibiting event, in a first rich condition for a first period until a catalytic converter of the exhaust system is in a predetermined first rich state, and operating the engine in a lean condition for a second period contiguously following the first period. The method further includes determining a catalyst efficiency of the catalytic converter based on an output of an oxygen sensor located downstream of the catalytic converter during the second period, and selectively adjusting a diagnostic status of the catalytic converter based on a comparison of the catalyst efficiency and a predetermined catalyst efficiency. In one feature, the fuel inhibiting event may be a deceleration fuel-cutoff event.

In other features, the operating the engine in the first rich condition may include monitoring the output during the first period and ending the first rich condition when the output during the first period exceeds a predetermined output. In a related feature, the operating the engine in the first rich condition may include monitoring the output during the first period and ending the first rich condition when the oxygen sensor detects the first rich condition. In still other features, the operating the engine in the lean condition may continue until the catalytic converter is in a predetermined lean state. In a related feature, the operating the engine in the lean condition may include monitoring the output during the second period and ending the lean condition when the output during the second period falls below a predetermined output. In another related feature, the operating the engine in the lean condition may include monitoring the output during the second period and ending the lean condition when the oxygen sensor detects the lean condition.

In further features, the diagnostic method may further include operating the engine in a second rich condition for a third period contiguously following the second period, determining a first responsiveness of the oxygen sensor based on the output during the second period, and determining a second responsiveness of the oxygen sensor based on the output during the third period. The diagnostic method may also include selectively adjusting a diagnostic status of the oxygen sensor based on the first responsiveness and the second responsiveness.

In a related feature, the first responsiveness may be determined based on the output during a rich-to-lean transition period occurring within the second period and the second responsiveness may be determined based on the output during a lean-to-rich transition period occurring within the third period. The catalyst efficiency may be determined based on the output during the rich-to-lean transition period.

In another related feature, the determining the first responsiveness may include determining a first normalized integrated area of the output during the rich-to-lean transition period, the determining the second responsiveness may include determining a second normalized integrated area of the output during the lean-to-rich transition period, and the determining the catalyst efficiency may include determining a normalized oxygen storage capacity based on the output during the rich-to-lean transition period.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
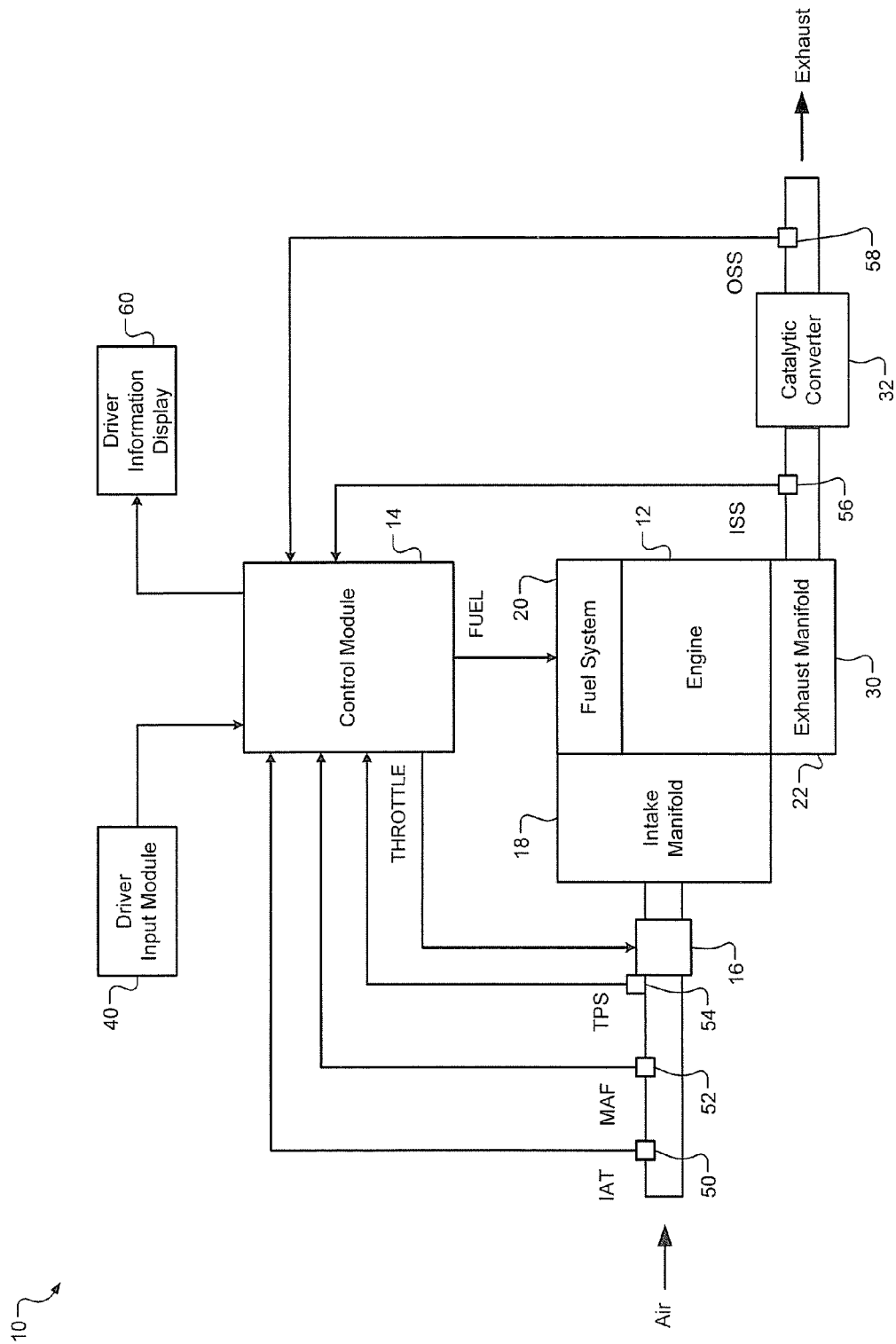
FIG. 1 is a functional block diagram illustrating an exemplary engine system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, and/or a combinational logic circuit that provides the described functionality.

With particular reference to FIG. 1, an exemplary engine system 10 according to the present disclosure is shown. The engine system 10 may be included in a vehicle (not shown). The engine system 10 may include an internal combustion engine 12 controlled by a control module 14. The engine 12 may combust a mixture of air and fuel in one or more cylinders (not shown) and thereby produce drive torque. Air may be drawn through a throttle 16 and an intake manifold 18 into the cylinders by pistons (not shown) that reciprocate within the cylinders. Fuel may be supplied to the cylinders by a fuel system 20. Exhaust produced by combustion may exit the engine 12 into the surroundings via an exhaust system 22.

The throttle 16 may control the amount of air entering the cylinders based on a THROTTLE signal received from the control module 14. The intake manifold 18 may distribute the air drawn through the throttle 16 to the various cylinders of the engine 12. The fuel system 20 may supply fuel to the cylinders based on a FUEL signal received from the control module 14.

The exhaust system 22 may include an exhaust manifold 30 that receives the exhaust from the engine 12 and a catalytic converter 32 that treats the exhaust. The catalytic converter 32 may be a three-way catalytic converter that reduces the emission of $NO_x$, CO, and HC. As such, the catalytic converter 32 may reduce $NO_x$ to nitrogen and oxygen, may oxidize CO to $CO_2$, and may oxidize HC to $CO_2$ and $H_2O$. Additionally, the catalytic converter 32 may release $O_2$ when the engine 12 is operated in a rich condition and may store $O_2$ when the engine 12 is operated in a lean condition.

The control module 14 may control the drive torque produced by the engine 12 by controlling the operation of various components of the engine system 10, such as the throttle 16 and the fuel system 20. The control module 14 may control the drive torque based on driver inputs received from a driver input module 40, such as an accelerator pedal (not shown), and various sensors and actuators included with the engine system 10.

The control module 14 may control the throttle 16 and the fuel system 20 such that a desired air-fuel (A/F) mixture is achieved in the cylinders. Generally, engines are operated at or near a stoichiometric A/F ratio. The stoichiometric A/F ratio is defined as an ideal A/F ratio corresponding to a balanced reaction during combustion. A/F ratio is defined as the mass ratio of air to fuel present during combustion. The stoichiometric A/F ratio varies depending on the particular fuel used for combustion. For gasoline engines, the stoichiometric A/F ratio is approximately 14.7 to 1. The engine 12 operates in a lean condition when the A/F ratio is greater than the stoichiometric ratio. The engine 12 operates in a rich condition when the A/F ratio is less than the stoichiometric A/F ratio.

The control module 14 may communicate with various sensors including, but not limited to, an intake air temperature (IAT) sensor 50, a mass air flow (MAF) sensor 52, a throttle position (TPS) sensor 54, a pre-catalyst $O_2$ sensor 56, and a post-catalyst $O_2$ sensor 58. The IAT sensor 50 may be located upstream of the throttle 16 and may sense a temperature of the air entering the throttle 16. The IAT sensor may generate an IAT signal indicative of the temperature sensed. The MAF sensor 52 may be located upstream of the throttle 16 and may sense a MAF of the air entering the throttle 16. The MAF sensor 52 may generate a MAF signal indicative of the MAF sensed. The TPS sensor 54 may sense a position of a butterfly valve (not shown) of the throttle 16 and may generate a TPS signal indicative of the position sensed.

The pre-catalyst $O_2$ sensor 56 and the post-catalyst $O_2$ sensor 58 may be located upstream and downstream of the catalytic converter 32, respectively, and may sense an oxygen content of the exhaust. As such, the pre-catalyst $O_2$ sensor 56 may sense the oxygen content of the exhaust entering the catalytic converter 32 and the post-catalyst $O_2$ sensor 58 may sense the oxygen content of the exhaust exiting the catalytic converter 32. The pre-catalyst $O_2$ sensor 56 and the post-catalyst $O_2$ sensor 58 may output an inlet sensor signal (ISS) and an outlet sensor signal (OSS), respectively, indicative of the oxygen content sensed. The ISS and OSS signals may be voltage signals that vary based on the oxygen content sensed. The voltage output may be lower when the engine 12 is operated in a lean condition than the voltage output when the engine 12 is operated in a rich condition.

The control module 14 may control the A/F ratio based on the output of one or more of the sensors. The ISS signal output by the pre-catalyst $O_2$ sensor 56 may provide the primary feedback on which control of the A/F ratio is based. The OSS signal output by the post-catalyst $O_2$ sensor 58 may provide secondary feedback on which control of the A/F ratio is based.

The control module 14 may monitor the performance of one or more components of the engine system 10. In particular, the control module 14 may be included in a diagnostic system that performs a diagnostic test to determine whether a particular component is malfunctioning. The control module 14 may communicate information regarding the engine system 10 to the driver via a driver information display 60 that displays the information to the driver. For example, the control module 14 may illuminate a malfunction indicator lamp (MIL) to indicate a problem has been detected with one or more components.

According to the present disclosure, the control module 14 monitors the performance of the catalytic converter 32 and the post-catalyst $O_2$ sensor 58 during a common diagnostic test that is initiated in response to a request for a fuel inhibiting event. Generally, a fuel inhibiting event is an event during which the engine is operated in a lean condition for a period of time. As one example, the fuel inhibiting event may be a vehicle deceleration fuel-cutoff (DFCO) event. During a DFCO event, the provision of fuel to the cylinders may be halted. The control module 14 determines diagnostic values for the catalytic converter 32 and the post-catalyst $O_2$ sensor 58 based on the output of the pre-catalyst and post-catalyst $O_2$ sensors 56, 58 during the diagnostic test. The control module 14 compares the diagnostic values to corresponding predetermined values and determines a PASS/FAIL status for the catalytic converter 32 and the post-catalyst $O_2$ sensor 58 based on the comparisons.

In the foregoing manner, the control module 14 may selectively adjust a diagnostic status of the exhaust system 22. The control module 14 may communicate the diagnostic status to the driver via the information display 60. The control module 14 may also selectively adjust one or more operating parameters of the engine 12 based on the diagnostic status. For example, the control module 14 may refrain from using the OSS signal output by the post-catalyst $O_2$ sensor 58 as feedback for controlling the A/F ratio when a problem has been detected with the post-catalyst $O_2$ sensor 58. As another example, the control module 14 may initiate remedial measures to control the emissions in the exhaust when a problem has been detected with the catalytic converter 32.

By using a common diagnostic test, the number and duration of intrusive fuel transition events required to monitor the performance of both the catalytic converter 32 and the post-catalyst $O_2$ sensor 58 may be reduced. Additionally, by performing the diagnostic test during a fuel inhibiting event while the engine 12 is not operating at idle, the diagnostic test may be more suitable to hybrid engine applications where it is not desired to operate the engine 12 at idle for the periods required for such methods. By commanding a rich condition between periods of the fuel inhibiting event, the diagnostic test may also reduce $NO_X$ emissions.

Figure 2:
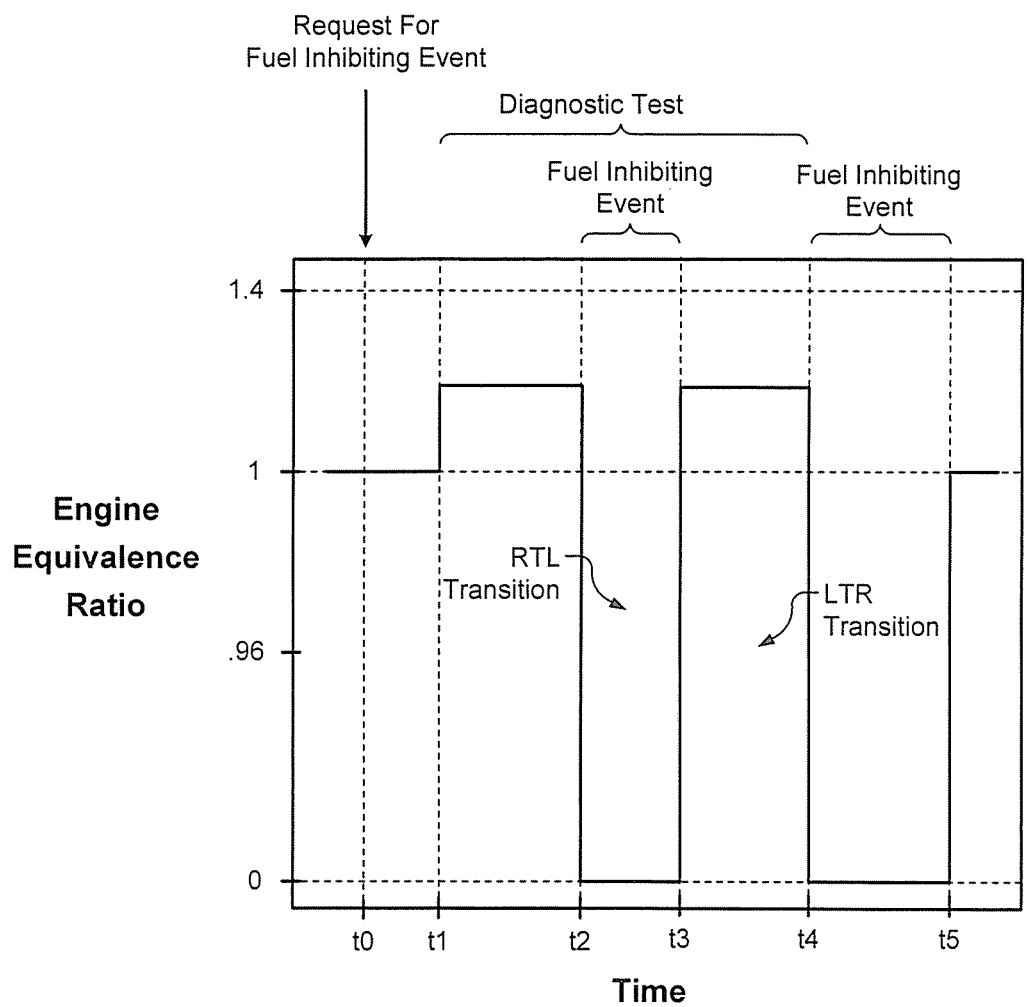
FIG. 2 is a chart of engine equivalence ratio versus time illustrating fuel control according to the present disclosure.

With particular reference to FIG. 2, an exemplary diagnostic test according to the present disclosure will be described in further detail. FIG. 2 includes a graph illustrating a commanded engine equivalence ratio as a function of time for the exemplary diagnostic test. For simplicity, equivalence ratio was chosen over A/F ratio for the graph. Equivalence ratio is defined as the numerical ratio of the actual fuel-air (F/A) ratio to the stoichiometric F/A ratio. The equivalence ratio is one when the actual F/A ratio is equal to the stoichiometric F/A ratio. Additionally, equivalence ratios greater than one are indicative of rich conditions, while equivalence ratios less than one are indicative of lean conditions.

At a time t0, a request for a fuel inhibiting event is generated. As one example, the fuel inhibiting event may be a DFCO event. During the DFCO event, provision of fuel to the cylinders may be halted. A request for the DFCO event may be made during vehicle coast down to improve fuel economy.

The diagnostic test begins at a time t1 when, in response to the request, a first rich condition is initiated prior to a time t2 when the fuel inhibiting event is subsequently initiated. The first rich condition may be sustained until the catalytic converter 32 is in a predetermined first rich state. The first rich condition may be initiated and sustained by controlling the A/F mixture such that the equivalence ratio during the first period is greater than one. The first rich state may be confirmed by monitoring the output (e.g., voltage) of the post-catalyst $O_2$ sensor 58 and detecting when the output exceeds a first predetermined output. Accordingly, the first rich condition may be sustained until the OSS signal indicates the catalytic converter 32 is in the first rich state.

Alternatively or additionally, the first rich condition may be sustained for a predetermined first period sufficient to allow the catalytic converter 32 to achieve the first rich state. The first rich state may be a state in which oxygen storage within the catalytic converter 32 is zero.

While the equivalence ratio transition at time t1 is shown as a step transition, it should be understood that the equivalence ratio may be ramped up beginning at time t1. For example only, the equivalence ratio may increase at a steady rate before leveling out at a predetermined equivalence ratio for the duration of the first period. Other suitable transitions may be used. Additionally, it should be understood that the equivalence ratio during the first period may vary. Ramped transitions and varied equivalence ratios during the first period may be preferable to maintain engine stability.

Following the period of the first rich condition at time t2, the requested fuel inhibiting event is initiated. The fuel inhibiting event may be initiated contiguous with the period during which the first rich condition is sustained. Accordingly, the fuel inhibiting event may be initiated when the output of the post-catalyst $O_2$ sensor 58 exceeds the first predetermined output. Alternately or additionally, the fuel inhibiting event may be initiated contiguous with the predetermined first period. During the fuel inhibiting event, the provision of fuel to one or more cylinders of the engine 12 may be halted. The fuel inhibiting event may be sustained until a rich-to-lean transition has occurred and the catalytic converter 32 is in a predetermined first lean state. The first lean state may be confirmed by monitoring the output of the post-catalyst $O_2$ sensor 58 and detecting when the output falls below a second predetermined output. Accordingly, the fuel inhibiting event may be sustained until the OSS signal indicates the catalytic converter 32 is in the first lean state. The second predetermined output may be less than the first predetermined output.

Alternatively or additionally, the fuel inhibiting event may be sustained for a predetermined second period sufficient to enable the rich-to-lean transition and to allow the catalytic converter 32 to achieve the first lean state. The second period may commence when the fuel inhibiting event is initiated or when the pre-catalyst $O_2$ sensor 56 senses the rich-to-lean transition. The second period may account for delays between the command to initiate the fuel inhibiting event and corresponding changes in the oxygen content of the exhaust reaching the pre-catalyst and post-catalyst $O_2$ sensors 56, 58. The second period may also account for oxygen storage by the catalytic converter 32 and expected response times of the pre-catalyst and post-catalyst $O_2$ sensors 56, 58.

Following the period of the fuel inhibiting event at a time t3, a second rich condition is initiated. The second rich condition may be initiated contiguous with the period during which the lean condition of the fuel inhibiting event is sustained. Accordingly, the second rich condition may be initiated when the output of the post-catalyst $O_2$ sensor 58 falls below the second predetermined output. Alternately or additionally, the second rich condition may be initiated contiguous with the predetermined second period. The second rich condition may be sustained until a lean-to-rich transition has occurred and the catalytic converter 32 has returned to a state equal to the first rich state. The second rich condition may be initiated and sustained by controlling the A/F mixture such that the equivalence ratio during the third period is greater than one.

Alternatively or additionally, the second rich condition may be sustained for a predetermined third period sufficient to enable the lean-to-rich transition in the exhaust to be sensed by both the pre-catalyst and post-catalyst $O_2$ sensors 56, 58 and to allow the catalytic converter to achieve the desired state. The third period may account for stored oxygen release by the catalytic converter 32.

Similar to the equivalence ratio transition at time t1, the equivalence ratio transition at time t3 may be a step transition, a ramp transition, or another suitable transition. Additionally, the equivalence ratio may vary during the third period. Alternatively or additionally, the second rich condition may end when the post-catalyst $O_2$ sensor 58 senses the lean-to-rich transition.

Following the period of the second rich condition at a time t4, the fuel inhibiting event may be continued. The fuel inhibiting event may be continued contiguous with the period of the second rich condition when the request for the fuel inhibiting event continues at the end of the period of the second rich condition. The fuel inhibiting event may be sustained while the request for the fuel inhibiting event continues. The fuel inhibiting event may end at a time t5 once the request for the fuel inhibiting event ends. Beginning at time t5, a stoichiometric condition may resume. The transition at time t5 between the fuel inhibiting event and the stoichiometric condition may be a step transition as shown or may be a ramp transition or other suitable transition.

According to the diagnostic test, $O_2$ sensor performance diagnostic values for the post-catalyst $O_2$ sensor 58 and a catalyst efficiency diagnostic value for the catalytic converter 32 may be determined based on the output of the pre-catalyst and post-catalyst $O_2$ sensors 56, 58 during the rich-to-lean transition that occurs between time t2 and time t3 and/or the subsequent lean-to-rich transition that occurs between time t3 and time t4. In particular, the post-catalyst $O_2$ sensor performance diagnostic (POPD) values may be based on the output of the post-catalyst $O_2$ sensor 58 during the rich-to-lean transition that occurs during the period of the fuel inhibiting event and the lean-to-rich transition that occurs after initiating the second rich condition. The POPD values may be indicative of an oxygen sensor performance measure such as, but not limited to, sensor responsiveness. Additionally, the catalyst efficiency diagnostic value may be based on the output of the post-catalyst $O_2$ sensor 58 during the rich-to-lean transition that occurs after initiating the fuel inhibiting event.

Each of the POPD values may be compared to corresponding predetermined performance values to determine whether the post-catalyst $O_2$ sensor 58 is functioning properly. Similarly, the catalyst efficiency diagnostic value may be compared to a predetermined efficiency value to determine whether the catalytic converter 32 is functioning properly. A PASS/FAIL status of the post-catalyst $O_2$ sensor 58 and the catalytic converter 32 may be determined based on the comparisons.

The POPD values can be determined according to known methods based on the post-catalyst $O_2$ sensor signal (i.e., OSS signal) during a rich-to-lean transition and/or a lean-to-rich transition. According to one known method, a POPD value may be determined by computing an integrated area (IA) above or below the sensor's voltage signal during the rich-to-lean transition and/or the lean-to-rich transition. The IA is indicative of the sensor's responsiveness to changes in oxygen content.

The calculated IAs may be normalized based on exhaust flow rates at the beginning of the rich-to-lean and lean-to-rich transitions and/or switching rates of the pre-catalyst $O_2$ sensor 56 during the rich-to-lean and the lean-to-rich transitions. An exemplary system and method for determining an IA and normalizing the IA is disclosed in commonly assigned U.S. patent application Ser. No. 11/671,916 entitled "Post Catalyst Oxygen Sensor Diagnostic", now issued as U.S. Pat. No. 7,444,235.

The catalyst efficiency diagnostic value can be an OSC diagnostic value. The OSC diagnostic value can be determined according to known methods for computing an OSC of a catalytic converter based on pre-catalyst and post-catalyst $O_2$ sensor signals (i.e., ISS and OSS signals) during a rich-to-lean and/or a lean-to-rich transition. The known methods include, but are not limited to, time-based, mass-based, wavelength-based, wave magnitude-based, wave area-based, or sensor signal frequency-based methods. According to one time-based method, the OSC can be determined based on a lag time between the pre-catalyst $O_2$ sensor 56 sensing a rich condition and the post-catalyst sensing the rich condition during a lean-to-rich transition. An exemplary system and method for determining an OSC based on the lag time is disclosed in commonly assigned U.S. patent application Ser. No. 10/341,616 entitled "Method and Apparatus For Monitoring Catalyst Efficiency And Secondary Air Injection", now issued as U.S. Pat. No. 6,802,181.

The OSC may be normalized based on a normalization ratio that is computed based on a compensated OSC and a best unacceptable OSC and a worst acceptable OSC. The compensated OSC may be a function of a percentage of a component of the fuel, such as a percentage ethanol in the fuel, and a fuel control value at the time the OSC is calculated, such as a short-term fuel trim value. The best unacceptable OSC may be based on the performance of a converter that produces emissions at a predetermined percentage over an emissions standard. The worst acceptable OSC may be based on the performance of a converter that produces emissions at or below the emissions standard. The best unacceptable OSC and worst acceptable OSC may be a function of MAF and converter temperature. An exemplary system and method for normalizing an OSC is disclosed in commonly assigned U.S. patent application Ser. No. 11/688,406 entitled "Normalizing Oxygen Sensor Storage Capacity (OSC) For Catalyst Monitoring", now published as U.S. Patent Application Pub. No. 2008/0229727.

Figure 3:
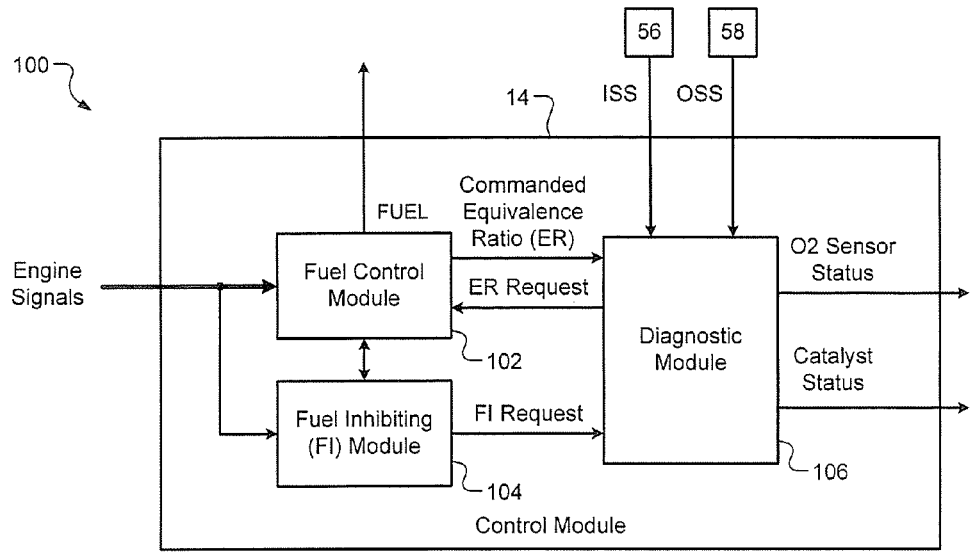
FIG. 3 is a functional block diagram illustrating an exemplary control and diagnostic system according to the present disclosure.

With particular reference to FIG. 3, an exemplary implementation of the control module 14 is shown in an exemplary control and diagnostic system 100 according to the present disclosure. The control module 14 includes sub-modules that work together to implement the foregoing diagnostic test. Exemplary sub-modules are shown in FIG. 3 and will be described in further detail below. It will be appreciated that in alternate implementations, the sub-modules may be combined and/or divided. It will be further appreciated that one or more of the sub-modules may be implemented in other modules (not shown) of the engine system 10 that may communicate with the control module 14.

The control module 14 includes a fuel control module 102, a fuel inhibiting (FI) module 104, and a diagnostic module 106. The fuel control module 102 receives various signals and generates the FUEL signal based on the signals received that is output to the fuel system 20 and that controls the A/F ratio. Accordingly, the fuel control module 102 also controls the equivalence ratio. The signals may include various engine signals and an FI request generated by the FI module 104.

The FI module 104 receives various engine signals and generates the FI request to indicate whether a fuel inhibiting event is requested. The FI request may indicate whether a DFCO event is requested. The FI module 104 may output the FI request to the fuel control module 102 and the diagnostic module 106.

The diagnostic module 106 determines the PASS/FAIL status for the catalytic converter 32 and the post-catalyst $O_2$ sensor 58 based on various inputs received. The inputs may include, but are not limited to, the FI request, the commanded equivalence ratio, and the ISS and OSS signals generated by the pre-catalyst and post catalyst $O_2$ sensors 56, 58. The diagnostic module 106 also generates an equivalence ratio (ER) request when performing the diagnostic test that may be output to the fuel control module 102 and that causes the engine to operate at the desired equivalence ratio during the diagnostic test.

Figure 4:
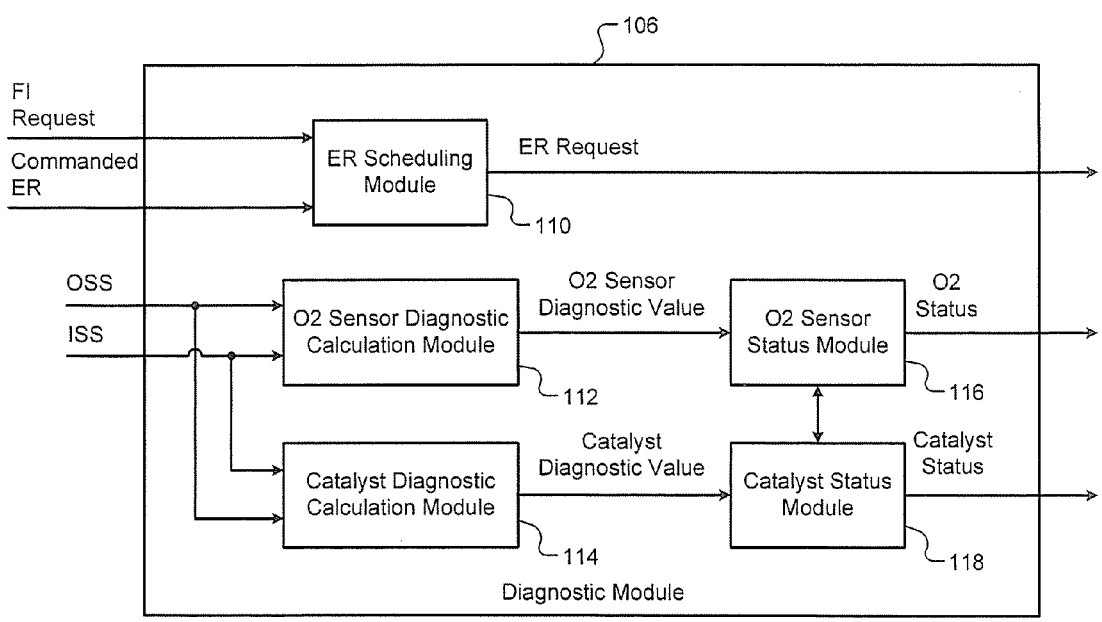
FIG. 4 is a functional block diagram illustrating an exemplary implementation of the diagnostic module shown in FIG. 3.

With particular reference to FIG. 4, an exemplary implementation of the diagnostic module 106 may include an ER scheduling module 110, an $O_2$ sensor diagnostic calculation module 112, a catalyst diagnostic calculation module 114, an $O_2$ sensor status module 116, and a catalyst status module 118.

The ER scheduling module 110 receives the FI request and commanded ER and generates the ER request that causes the engine 12 to operate at the desired equivalence ratio during the diagnostic test. Via the ER request, the ER scheduling module 110 causes the engine 12 to operate, in response to the request for a fuel inhibiting event, in the series of rich and lean conditions according to the diagnostic test disclosed above.

The $O_2$ sensor diagnostic calculation module 112 and catalyst diagnostic calculation module 114 monitor the ISS and OSS signals during the diagnostic test. The $O_2$ sensor diagnostic calculation module 112 and the catalyst diagnostic calculation module 114 calculate, respectively, the POPD values and the catalyst efficiency diagnostic value based on the ISS and OSS signals during the diagnostic test. As discussed above, the diagnostic values may be calculated based on the ISS and OSS signals during the rich-to-lean and/or subsequent lean-to-rich transitions of the diagnostic test. The sensor diagnostic calculation module 112 and the catalyst diagnostic calculation module 114 may receive other inputs and signals (not shown) that are used to calculate the diagnostic values. The $O_2$ sensor diagnostic calculation module 112 and catalyst diagnostic calculation module 114 may output the diagnostic values to the $O_2$ sensor status module 116 and the catalyst status module 118 as shown.

The $O_2$ sensor status module 116 compares the POPD values and the corresponding predetermined performance values and determines the status of the post-catalyst $O_2$ sensor 58 based on the comparisons. The $O_2$ sensor status module 116 may output the $O_2$ sensor status as shown.

The catalyst status module 118 compares the catalyst efficiency diagnostic value and the predetermined efficiency value and determines the status of the catalytic converter 32 based on the comparison. The catalyst status module 118 may output the catalyst status as shown.

Figure 5:
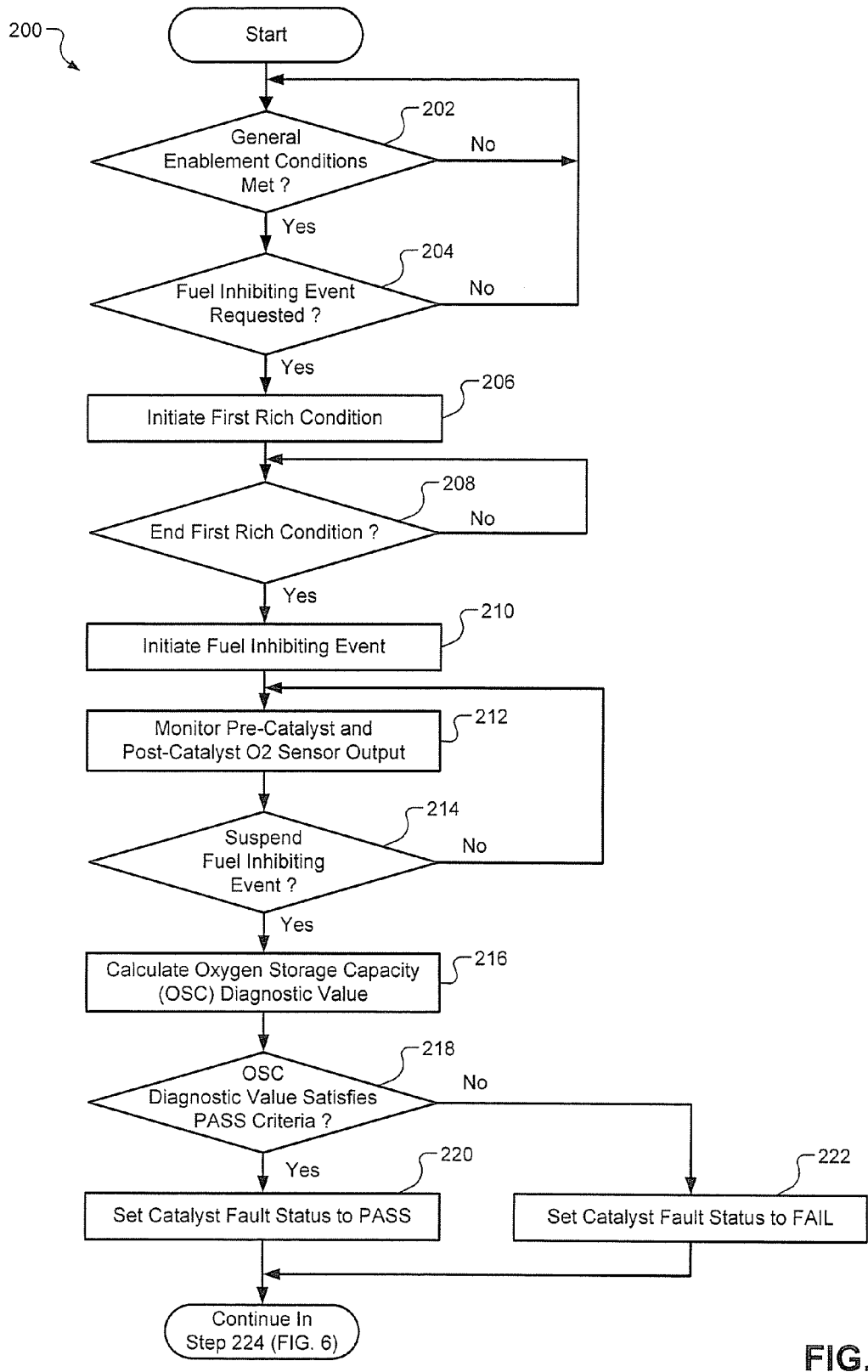
FIG. 5 is a partial flow diagram illustrating exemplary steps in a diagnostic method according to the present disclosure.
Figure 6:
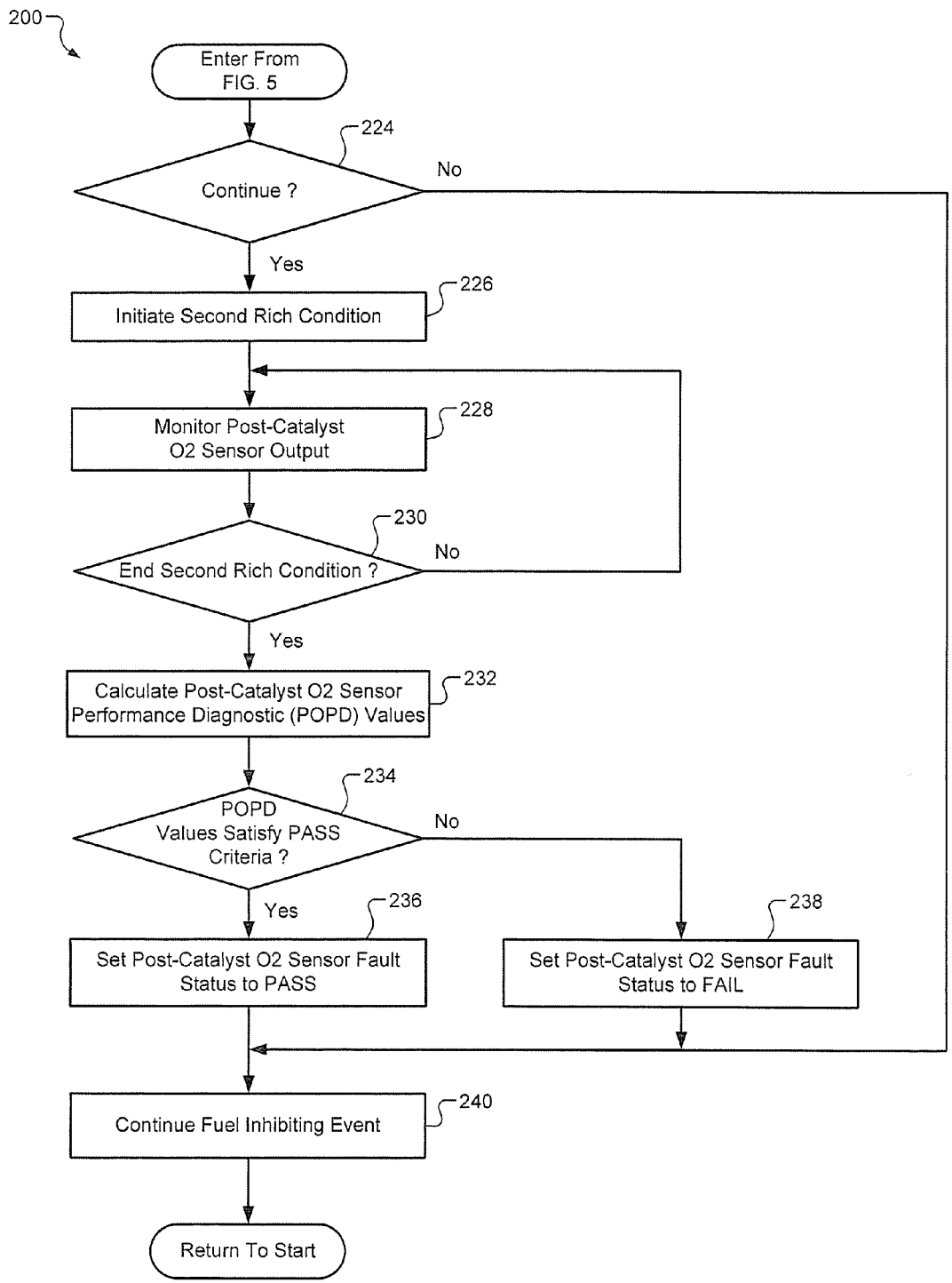
FIG. 6 is a partial flow diagram illustrating additional exemplary steps in the diagnostic method according to the present disclosure.

With reference to FIGS. 5-6, an exemplary method 200 for determining $O_2$ sensor performance and catalyst efficiency diagnostic values according to the present disclosure is shown. The diagnostic method 200 may be implemented in an engine system, such as the engine system 10 described above. For example, the method 200 may be implemented in one or more modules and/or sub-modules of the engine system. The diagnostic method 200 includes exemplary steps for controlling combustion in an engine prior to and during a requested fuel inhibiting event so that the performance of a post-catalyst $O_2$ sensor and the conversion efficiency of a catalytic converter may be periodically monitored and assessed. The method 200 may be periodically run during engine operation to regularly monitor the post-catalyst $O_2$ sensor and catalytic converter and to regularly update a fault status for each.

With particular reference to FIG. 5, the diagnostic method 200 begins in step 202 where control determines whether general enablement conditions are met. If the general enablement conditions are met, then control proceeds in step 204, otherwise control loops back as shown. The general enablement conditions will generally be met when diagnostic monitoring of the catalytic converter and post-catalyst $O_2$ sensor is desired and there are no overriding reasons for disabling diagnostic monitoring. As one example, an overriding reason may exist when an existing fault would prevent an accurate determination of post-catalyst $O_2$ sensor performance and/or catalytic converter efficiency. The fault can be any number of faults, including, but not limited to, a MAF sensor fault, a pre-catalyst $O_2$ sensor fault, a post-catalyst $O_2$ sensor fault, or a control module (e.g., control module 14) fault. As another example, an overriding reason may exist when control of the engine equivalence ratio according to the method cannot be achieved due to open loop fuel control or a malfunctioning component of the fuel system.

In step 204, control determines whether a fuel inhibiting event has been requested. If a fuel inhibiting event has been requested, then control proceeds in step 206, otherwise control loops back as shown. It should be understood that control may proceed in steps 206-240 as described below while the request for the fuel inhibiting event continues. If the request for the fuel inhibiting event is discontinued while control is proceeding in one of steps 206-240, control may exit control according to the method 200 to another suitable control method. Alternately, control may continue for one or more steps described below.

In step 206, control initiates, in response to the request for a fuel inhibiting event, a first rich condition prior to initiating the requested fuel inhibiting event. Control may initiate the first rich condition by controlling the A/F mixture entering the cylinders of the engine such that the equivalence ratio is greater than one. From step 206, control may proceed in step 208.

In step 208, control determines whether to end the first rich condition. Control may sustain the first rich condition for a first period until the catalytic converter is in a predetermined first rich state. Control may monitor the output of the post-catalyst $O_2$ sensor during the first period and may sustain the first rich condition until the output exceeds a first predetermined output corresponding to the first rich state. Accordingly, control may end the first rich condition when the output exceeds the first predetermined output. From step 208, control may proceed in step 210.

In step 210, control initiates the requested fuel inhibiting event, causing the engine to operate in a lean condition. During the fuel inhibiting event, the provision of fuel to the cylinders of the engine may be halted. From step 210, control may proceed in step 212.

In step 212, control monitors the output of the pre-catalyst and post-catalyst O2 sensors during the fuel inhibiting event. In various implementations, control may also monitor the output of other sensors during the fuel inhibiting event. Next, in step 214, control determines whether to suspend the fuel inhibiting event. Control may sustain the fuel inhibiting event for a second period following the first period until a rich-to-lean transition has occurred and the catalytic converter is in a predetermined first lean state. Control may sustain the fuel inhibiting event until the output of the post-catalyst O2 sensor falls below a second predetermined output corresponding to the first lean state. Accordingly, control may end the second period and begin suspending the fuel inhibiting event when the output falls below the second predetermined output. From step 214, control may proceed in step 216.

In step 216, control calculates an OSC diagnostic value for the catalytic converter based on the output of the pre-catalyst and post-catalyst $O_2$ sensors during the fuel inhibiting event. In various implementations, control may calculate the OSC diagnostic value based on the output of other sensors during the fuel inhibiting event. The OSC diagnostic value may be calculated by any one of known methods and may be a normalized OSC as discussed above. From step 216, control may proceed in step 218.

In step 218, control determines whether the OSC diagnostic value satisfies PASS criteria. If the OSC diagnostic value satisfies the PASS criteria, then control proceeds in step 220, otherwise control proceeds in step 222. To determine whether the OSC diagnostic value satisfies the PASS criteria, control may compare the OSC diagnostic value and a predetermined OSC. Control may determine the OSC diagnostic value satisfies the PASS criteria when the OSC diagnostic value is greater than the predetermined OSC.

In step 220, control sets the catalyst fault status to PASS and control may proceed in step 224 (FIG. 6). In step 222, control sets the catalyst fault status to FAIL and control may proceed in step 224.

With particular reference to FIG. 6, step 224 is shown. In step 224, control determines whether to continue control in steps 226-238 or to continue in step 240. Control may decide to continue in steps 226-238 when it is desired to update the fault status of the post-catalyst $O_2$ sensor. Control may determine to continue instead in step 240 when the fault status of the post-catalyst $O_2$ sensor was previously set to FAIL. Generally, control will proceed in steps 226-238 as shown.

In step 226, control initiates a second rich condition while the engine is operating in the lean condition caused by the fuel inhibiting event initiated in step 210. Control may initiate the second rich condition as soon as the output of the post-catalyst $O_2$ sensor has fallen below the second predetermined output. From step 226, control may proceed in step 228.

In step 228, control monitors the output of the post-catalyst O2 sensor during a period of the second rich condition. In various implementations, control may also monitor the output of other sensors including the pre-catalyst O2 sensor. Next, in step 230, control determines whether to end the second rich condition. Control may sustain the second rich condition for a third period until the catalytic converter is in a state equal to the first rich state. Control may sustain the second rich condition until the output of the post-catalyst O2 sensor exceeds the first predetermined output. Accordingly, control may end the second rich condition when the output exceeds the first predetermined output. From step 230, control may proceed in step 232.

In step 232, control calculates a first POPD value for the post-catalyst O₂ sensor based on the output of the post-catalyst O₂ sensor during the rich-to-lean transition that occurred during the second period of the fuel inhibiting event. Control further calculates a second POPD value for the post-catalyst O₂ sensor based on the output of the post-catalyst O₂ sensor during the lean-to-rich transition that occurred during the third period while the second rich condition was sustained. The POPD values may be calculated by any one of known methods and each may be an IA calculation based on a voltage output of the post-catalyst O₂ sensor during the second and third periods as discussed above. From step 232, control proceeds in step 234.

In step 234, control determines whether the POPD values satisfy corresponding PASS criteria. If the POPD values satisfy the PASS criteria, then control proceeds in step 236, otherwise control proceeds in step 238. To determine whether the POPD values satisfy the corresponding PASS criteria, control may compare the POPD values and corresponding predetermined performance values. For example, each of the predetermined performance values may be a predetermined IA. Accordingly, control may determine the POPD values meet the PASS criteria when both the calculated IAs are less than the corresponding predetermined IAs.

In step 236, control sets the post-catalyst O₂ sensor fault status to PASS. In step 238, control sets the post-catalyst O₂ sensor fault status to FAIL. From step 236 or step 238, control may proceed in step 240.

In step 240, control continues the fuel inhibiting event while the request for the fuel inhibiting event continues. Once the request for the fuel inhibiting event ends, control may return in step 202 to begin another control loop in the method 200.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A diagnostic system for an exhaust system of an engine comprising:
a first electronic circuit configured to, in response to a request for a fuel inhibiting event, operate said engine in a first rich condition for a first period until a catalytic converter of said exhaust system is in a predetermined first rich state, subsequently cut off fuel to said engine for a second period contiguous with said first period, subsequently operate said engine in a second rich condition for a third period contiguous with said second period, and subsequently cut off fuel to said engine for a fourth period contiguous with said third period;
a second electronic circuit configured to determine a catalyst efficiency of said catalytic converter based on an output of an oxygen sensor located downstream of said catalytic converter during said second period, to selectively adjust a diagnostic status of said catalytic converter based on a comparison of said catalyst efficiency and a predetermined catalyst efficiency, to determine a first responsiveness of said oxygen sensor based on said output during said second period, to determine a second responsiveness of said oxygen sensor based on said output during said third period, and to selectively adjust a diagnostic status of said oxygen sensor based on said first responsiveness and said second responsiveness; and
an information display that communicates the diagnostic status of said catalytic converter to a user,
wherein one or more operating parameters of said engine are selectively adjusted based on said diagnostic status of said catalytic converter.

2. The diagnostic system of claim 1 wherein said fuel inhibiting event is a deceleration fuel-cutoff event.

3. The diagnostic system of claim 1 wherein said first period ends when said output during said first period exceeds a predetermined output.

4. The diagnostic system of claim 1 wherein said first period ends when said oxygen sensor detects said first rich condition.

5. The diagnostic system of claim 1 wherein said first electronic circuit is configured to cut off fuel to said engine during said second period until said catalytic converter is in a predetermined lean state.

6. The diagnostic system of claim 5 wherein said second period ends when said output during said second period falls below a predetermined output.

7. The diagnostic system of claim 5 wherein said second period ends when said oxygen sensor detects a lean condition.

8. The diagnostic system of claim 1 wherein said first responsiveness is determined based on said output during a rich-to-lean transition period occurring within said second period and said second responsiveness is determined based on said output during a lean-to-rich transition period occurring within said third period, and wherein said catalyst efficiency is determined based on said output during said rich-to-lean transition period.

9. The diagnostic system of claim 8 wherein said second electronic circuit is configured to:
determine said first responsiveness by determining a first normalized integrated area of said output during said rich-to-lean transition period,
determine said second responsiveness by determining a second normalized integrated area of said output during said lean-to-rich transition period, and
determine said catalyst efficiency by determining a normalized oxygen storage capacity based on said output during said rich-to-lean transition period.

10. The diagnostic system of claim 1 wherein the second electronic circuit is configured to determine an oxygen storage capacity (OSC) of said catalytic converter based on said output of said oxygen sensor and a second output of a second oxygen sensor located upstream of said catalytic converter during at least one of said second period and said third period, to normalize said OSC based on a normalization ratio, and to selectively adjust said diagnostic status of said catalytic converter based on a comparison of said OSC and a predetermined value.

11. The diagnostic system of claim 10 wherein the second electronic circuit is configured to calculate said normalization ratio based on a compensated OSC determined as a function of an amount of ethanol in fuel and a fuel control value, a first predetermined OSC determined as a function of a mass air flowrate (MAF) and a converter temperature, and a second predetermined OSC determined as a function of said MAF and said converter temperature.

12. The diagnostic system of claim 1 wherein the first and second electronic circuits include at least one of an Application Specific Integrated Circuit (ASIC), a processor and memory including one or more programs, and a combinational logic circuit.

13. A diagnostic method for an exhaust system of an engine comprising:
operating said engine, in response to a request for a fuel inhibiting event, in a first rich condition for a first period until a catalytic converter of said exhaust system is in a predetermined first rich state;

cutting off fuel to said engine for a second period contiguously following said first period;

operating said engine in a second rich condition for a third period contiguously following said second period;

cutting off fuel to said engine for a fourth period contiguously following said third period;

determining a catalyst efficiency of said catalytic converter based on an output of an oxygen sensor located downstream of said catalytic converter during said second period;

selectively adjusting a diagnostic status of said catalytic converter based on a comparison of said catalyst efficiency and a predetermined catalyst efficiency;

determining a first responsiveness of said oxygen sensor based on said output during said second period;

determining a second responsiveness of said oxygen sensor based on said output during said third period;

selectively adjusting a diagnostic status of said oxygen sensor based on said first responsiveness and said second responsiveness;

communicating the diagnostic status of said catalytic converter to a user via an information display; and selectively adjusting at least one operating parameter of said engine based on said diagnostic status of said catalytic converter.

14. The diagnostic method of claim 13 wherein said fuel inhibiting event is a deceleration fuel-cutoff event.

15. The diagnostic method of claim 13 wherein said operating said engine in said first rich condition includes monitoring said output during said first period and ending said first rich condition when said output during said first period exceeds a predetermined output.

16. The diagnostic method of claim 13 wherein said operating said engine in said first rich condition includes monitoring said output during said first period and ending said first rich condition when said oxygen sensor detects said first rich condition.

17. The diagnostic method of claim 13 wherein said cutting off fuel to said engine continues until said catalytic converter is in a predetermined lean state.

18. The diagnostic method of claim 17 further comprising monitoring said output during said second period and ending said cutting off fuel to said engine when said output during said second period falls below a predetermined output.

19. The diagnostic method of claim 17 further comprising monitoring said output during said second period and ending said cutting off fuel to said engine when said oxygen sensor detects said lean condition.

20. The diagnostic method of claim 13 wherein said first responsiveness is determined based on said output during a rich-to-lean transition period occurring within said second period and said second responsiveness is determined based on said output during a lean-to-rich transition period occurring within said third period, and wherein said catalyst efficiency is determined based on said output during said rich-to-lean transition period.

21. The diagnostic method of claim 20 wherein:
said determining said first responsiveness includes determining a first normalized integrated area of said output during said rich-to-lean transition period,
said determining said second responsiveness includes determining a second normalized integrated area of said output during said lean-to-rich transition period, and
said determining said catalyst efficiency includes determining a normalized oxygen storage capacity based on said output during said rich-to-lean transition period.

22. The diagnostic method of claim 13 wherein determining said catalyst efficiency comprises:
determining an oxygen storage capacity (OSC) of said catalytic converter based on said output of said oxygen sensor and a second output of a second oxygen sensor located upstream of said catalytic converter during at least one of said second period and said third period; and
normalize said OSC based on a normalization ratio, and
wherein selectively adjusting said diagnostic status of said catalytic converter comprises selectively adjusting said diagnostic status of said catalytic converter based on a comparison of said OSC and a predetermined value.

23. The diagnostic method of claim 22 further comprising calculating said normalization ratio based on a compensated OSC determined as a function of an amount of ethanol in fuel and a fuel control value, a first predetermined OSC determined as a function of a mass air flowrate (MAF) and a converter temperature, and a second predetermined OSC determined as a function of said MAF and said converter temperature.

* * * * *